United States Patent
Marx

(10) Patent No.: US 12,509,148 B2
(45) Date of Patent: Dec. 30, 2025

(54) YAW COMPENSATION SYSTEM, METHOD FOR RESTORING A SAFE DRIVING STATE, VEHICLE BRAKE SYSTEM AND MOTOR VEHICLE

(71) Applicant: ZF Active Safety GmbH, Koblenz (DE)

(72) Inventor: Andreas Marx, Hartenfels (DE)

(73) Assignee: ZF Active Safety GmbH, Koblenz (DE)

( * ) Notice: Subject to any disclaimer, the term of this patent is extended or adjusted under 35 U.S.C. 154(b) by 61 days.

(21) Appl. No.: 18/492,108

(22) Filed: Oct. 23, 2023

(65) Prior Publication Data

US 2024/0132150 A1 Apr. 25, 2024
US 2024/0227930 A9 Jul. 11, 2024

(30) Foreign Application Priority Data

Oct. 25, 2022 (DE) .......................... 102022128163.9

(51) Int. Cl.
*B62D 6/00* (2006.01)

(52) U.S. Cl.
CPC .................................. *B62D 6/003* (2013.01)

(58) Field of Classification Search
CPC ....... B62D 6/003; B60T 2230/00; B60T 7/12; B60T 13/74; B60T 2260/04; B60W 10/18; B60W 10/20; B60W 2520/125; B60W 2520/14; B60W 2520/28; B60W 30/02; B60W 50/0098
USPC ........................................................... 701/41
See application file for complete search history.

(56) References Cited

U.S. PATENT DOCUMENTS

| 4,611,199 | A  | * | 9/1986  | Seko ...................... A61B 5/746 340/576 |
| 2005/0216157 | A1 | * | 9/2005  | Sakata .................. B60T 8/1755 701/41 |
| 2019/0168745 | A1 | * | 6/2019  | Hashimoto ........... B60W 10/20 |
| 2020/0391711 | A1 | * | 12/2020 | Nitta ......................... B60T 7/20 |

FOREIGN PATENT DOCUMENTS

| DE | 102004019281 A1 | 11/2005 |
| DE | 102009026572 A1 | 12/2010 |
| DE | 102012217672 A1 | 6/2014  |
| DE | 102014200608 B4 | 12/2020 |
| DE | 102019216934 A1 | 5/2021  |

\* cited by examiner

*Primary Examiner* — Yi-Kai Wang
(74) *Attorney, Agent, or Firm* — Kristin L. Murphy

(57) ABSTRACT

The disclosure relates to a yaw compensation system for restoring a safe driving state in particular of a wheeled vehicle, such as a wheeled motor vehicle, for example a car. The disclosure furthermore relates to a method for restoring a safe driving state of the abovementioned vehicle, and to a motor vehicle.

14 Claims, 1 Drawing Sheet

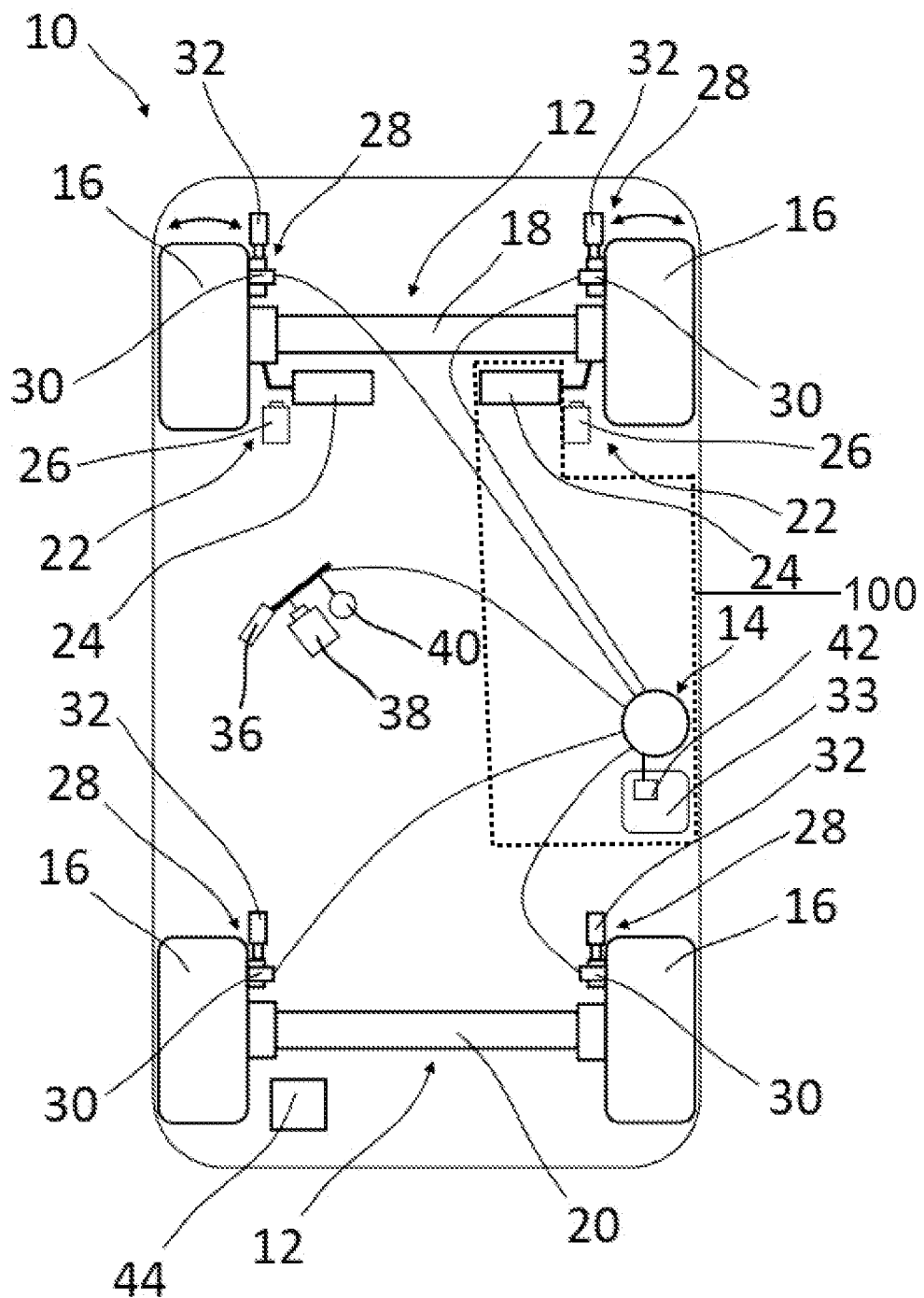

YAW COMPENSATION SYSTEM, METHOD FOR RESTORING A SAFE DRIVING STATE, VEHICLE BRAKE SYSTEM AND MOTOR VEHICLE

CROSS-REFERENCE TO RELATED APPLICATION

This application claims priority to German Priority Application No. 102022128163.9, filed Oct. 25, 2022, the disclosure of which is incorporated herein by reference in its entirety.

TECHNICAL FIELD

The disclosure relates to a yaw compensation system for restoring a safe driving state in particular of a wheeled vehicle, such as a wheeled motor vehicle, for example a car. The disclosure furthermore relates to a method for restoring a safe driving state of the abovementioned vehicle, and to a motor vehicle.

BACKGROUND

There is confined structural space in motor vehicles in the region of the wheel suspension at front axle wheels. The confined structural space makes it difficult to accommodate larger brake components on the wheel suspension. Increasing vehicle weights and higher driving speeds make it necessary for vehicle brakes to be bulky in order to be able to absorb the forces which occur. Structural space is also required for bulky electromechanical brakes (EMB) in which an actuator fastened to the brake supplies the braking force. However, further components of the motor vehicle also have to be placed on the wheel suspension in addition to the vehicle brake, which further restricts the available structural space.

One possibility for creating structural space is to adapt the axle geometry by shifting the steering axis towards the centre of the vehicle, as a result of which the suspension strut frees up structural space at the vehicle wheel in the region of the motor vehicle brake. However, this has a negative effect on the vehicle stability because the scrub radius is no longer negative and is positive instead. The scrub radius is the name for the horizontal distance, at the steered axles of vehicles, between the centre plane of the wheel and the point at which the steering axis intersects the road. If the point of intersection of the steering axis, viewed from the centre of the vehicle, is in front of the centre plane of the wheel, the scrub radius is positive.

However, a positive scrub radius can have a negative effect on the driving behaviour because when braking the vehicle can rotate about its vertical axis and the driver can lose control of the vehicle. A negative scrub radius is therefore often preferred in chassis design, more structural space being available for the motor vehicle brake in the case of a positive scrub radius.

Also, in the case of braking with different road friction coefficients between the right and left vehicle wheels (p-split braking) and with a positive scrub radius, a torque about the vertical axis is generated by a varying level of braking force at the vehicle wheel. Positive scrub radii amplify this effect and cause the vehicle to become destabilized. Vehicles with a negative scrub radius in contrast generate a counter-steering effect which causes the vehicle to remain in its lane despite a variation in the level of braking force.

SUMMARY

The disclosure relates to a yaw compensation system for restoring a safe driving state, comprising a driving dynamics sensor which is configured to determine a yaw dimension, a wheel angle setting unit and a processing unit which is configured to identify a driving state on the basis of the yaw dimension and comprises a driving stability closed-loop control procedure which is designed, in the case of an unsafe driving state, to restore a safe driving state by influencing the wheel angle setting unit, wherein the driving stability closed-loop control procedure for restoring a safe driving state comprises a variable damping amount.

The disclosure also relates to a method for restoring a safe driving state, wherein a yaw dimension is identified, a driving state is determined and, in the case of an unsafe driving state, a wheel angle setting unit is influenced by a driving stability closed-loop control procedure in order to restore a safe driving state, wherein a damping amount of the driving stability closed-loop control procedure is varied.

The lack of a counter-steering effect in vehicles with a positive scrub radius is accordingly replaced by a yaw compensation system with a driving dynamics sensor, a processing unit and a wheel angle setting unit. The yaw compensation system becomes active as soon as, for example, the yaw rate or yaw angle acceleration exceeds a threshold value. In addition to a threshold value, the duration of the yaw rate above a determined threshold value can also be used as a trigger criterion for the yaw compensation system. If the system detects driving instability on the basis of a yaw dimension, the driving stability is restored by a driving stability closed-loop control procedure by acting on the wheel angle setting unit.

The processing unit serves to evaluate the data of the driving dynamics sensor and to calculate, for example, the yaw rate and yaw angle acceleration and can be designed to activate a wheel angle setting unit. The processing unit is furthermore designed to perform the method according to the disclosure.

A wheel angle setting unit can comprise actuators which are designed to move the steered wheels of the motor vehicle in a predetermined angle to the longitudinal axis of the motor vehicle. It is in particular provided that the wheel angle setting unit is designed as a steer-by-wire (SbW) system. It is, however, also possible that the wheel angle setting unit is connected to the steering wheel of the motor vehicle via a mechanical connection. In each case, the wheel angle setting unit is capable of setting a predetermined steering angle independently of the driver.

A driving stability closed-loop control system is in particular a closed-loop controller which, supplied with input values, generates an output value such as a target wheel angle on the basis of the input values. The output value can be transmitted, for example, to the wheel angle setting unit. The driving stability closed-loop control procedure comprises in particular a PID closed-loop controller which can be adjusted while driving by different parameters such as, for example, a proportional amount, an integral amount and/or a derivative amount.

It is provided according to the disclosure that a damping amount of the driving stability closed-loop control procedure is variable in order to restore a safe driving state. The variability in the damping amount can here be time-limited, take place depending on the yaw rate, comprise a predetermined minimum duration and/or be subject to other time limitations. It is intended that a rotational angular relationship between the steering wheel and the wheel angle setting unit can be adapted by the changing damping amount of the driving stability closed-loop control procedure. The rotational angular relationship is produced by the driving stability closed-loop control procedure and describes the relationship between the steering angle at the steering wheel and the deflection of the front wheels caused by the wheel angle setting unit.

The level of the damping amount can here also be governed by the yaw dimension or follow a predetermined progression, wherein further parameters such as the wheel speed and steering wheel angle can also influence the damping amount, wherein a growing damping amount has proved, as the yaw dimension increases, to be advantageous in terms of more rapid vehicle controllability. A high yaw dimension signals an unsafe driving state, wherein a fast rising yaw dimension can also indicate an unsafe driving state. In this case, fast damping is useful for counteracting a further increase in the yaw dimension. The damping amount can also contain a component which changes over time. It has been shown that a high damping amount in particular at the beginning of the driving stability closed-loop control procedure has a positive influence on driving stability.

It is furthermore provided that a system comprises a wheel speed sensor and the driving dynamics sensor is configured to determine a lateral acceleration, wherein the processing unit is designed to increase the damping amount when the wheel speed and/or lateral acceleration rises.

The wheel speed sensor is designed to determine a wheel speed and the driving dynamics sensor is designed to determine a lateral acceleration and the driving stability can be restored on the basis of these values. These sensor values can also be used to detect an unsafe driving state; thus, for example, very different wheel speeds between wheels situated opposite each other with respect to the two vehicle sides/laterally allow the conclusion to be reached that the vehicle is in an unsafe state and the driving stability closed-loop control procedure should be activated.

It is thus also possible to adapt the driving stability closed-loop control procedure on the basis of the wheel speed and the lateral acceleration and to modify the damping, integral or proportional amount of the closed-loop control procedure. For this purpose it is provided that none the parameters of the driving stability closed-loop control procedure assume fixed, i.e. unchanging values and instead are variable, in particular can be adapted by motor vehicle sensors or calculation methods. In particular, closed-loop control parameters in the case of the driving stability closed-loop control procedure can change, in particular can change over time. For example, the damping amount can be high at the beginning of a closed-loop control procedure and decrease over time or decrease as the yaw rate decreases. The adaptation of the closed-loop control parameters over time makes it possible to increase the driving safety in a situation-specific manner without unsettling the driver with a sudden change in the driving behaviour or noticeable steering interventions.

It is additionally provided that the driving stability closed-loop control procedure can be implemented on one or more open-loop control unit. Further open-loop control units can therefore be involved in performing the driving stability closed-loop control procedure in addition to the processing unit and thus, for example, the measurement of the acceleration can take place in a different open-loop control unit than the driving stability closed-loop control procedure. A redundant design of the open-loop control units and processing units is also possible, which is conducive to driving safety. The processing unit can be, for example, a brake open-loop control unit or be implemented in a different open-loop control unit already present in the motor vehicle.

It is additionally provided that the yaw compensation system comprises a deceleration device which is designed to be activated by the driving stability closed-loop control procedure, wherein a safe driving state can be restored by in particular additional deceleration of at least one vehicle wheel. The deceleration device comprises parking and/or service brakes of the vehicle. A wheel brake can comprise, for example, a service brake and have pressure supplied to it via a pressure-generating unit. The braking of individual wheels by the wheel brake is initiated by the driving stability closed-loop control procedure with the aim of restoring a safe driving state.

A further exemplary arrangement provides that the system comprises a steering pulse generator with an electrical interface for the wheel angle setting unit, wherein the steering pulse generator is not linked mechanically to the steered axle and the restoration of the driving stability is effected without movement of the steering pulse generator. In particular, the yaw compensation system is designed as a steer-by-wire (SbW) system.

Because steering pulse generators such as the steering wheel and the wheel angle setting unit are mechanically separated, mechanical feedback from the wheel angle setting unit to the steering wheel is excluded. This affords advantages for the driver of the motor vehicle because they do not experience any disruptive pulses from the steering wheel. In the case of a steer-by-wire system, the position of the steering wheel is detected by a sensor and communicated via an electrical interface to a processing unit which then sets a target wheel angle. The target wheel angle can also be influenced by the yaw compensation system according to the disclosure in order to restore driving stability.

It can furthermore be provided that the yaw compensation system simulates for the driver via steering movement feedback a feeling of what the wheel position is relative to the vehicle. In particular, the yaw compensation system comprises a steering simulator. By virtue of the configuration as a steer-by-wire system, the mechanical link between the steering wheel and the position of the wheels is removed, as a result of which a transmission ratio between the steering wheel and the wheel angle can also be influenced. This configuration is particularly advantageous because a change in the closed-loop control parameters has no influence on the driver's steering feel. An adjustable feedback connection or feedback transmission can also be adjusted.

In particular, the combination of a steer-by-wire system and a brake-by-wire system is opportune for the method according to the disclosure because the structural space to be created at the wheel suspension is intended to be used for an electromechanical brake (EMB) and implementation of the two systems as x-by-wire is consequently opportune.

It is also provided that the driving stability can be restored by decelerating at least one vehicle wheel. The acceleration and deceleration of a vehicle wheel can here be controlled by the processing unit and can use the same, similar or different input variables as the trigger for the wheel angle setting unit. It is opportune here also to enable, for example, in addition to acting on the wheel angle setting, deceleration of at least one wheel because the counter-steering can be amplified as a result. It is possible as an option that, in the event of failure of the wheel angle setting unit, steering of the vehicle is effected by decelerating and accelerating vehicle wheels. For this purpose, the individual vehicle wheels of the motor vehicle can be decelerated via a wheel brake such as an EMB.

According to a further exemplary arrangement, a vehicle brake system is provided with a yaw compensation system. In particular, the yaw compensation system is configured according to one of the above described arrangements. In particular, the vehicle brake system has, at least one vehicle wheel, an electrical braking device which is designed to transmit a braking torque to the vehicle wheel, wherein in particular the electrical braking device is a service brake. The electrical braking device comprises in particular an electromechanical brake. The vehicle brake system with the yaw compensation system achieves rapid and precise braking performance with the aid of the electrical braking device in particular at the steered vehicle wheel. As a result, a particularly sensitive closed-loop control procedure can be implemented in order to restore the driving stability.

According to a further exemplary arrangement, a motor vehicle comprises a steered wheel with a positive scrub radius. In particular, the motor vehicle comprises a yaw compensation system according to the disclosure. In particular, the yaw compensation system works according to the method according to the disclosure. According to the disclosure, the motor vehicle has an electromechanical wheel service brake (EMB) at the steered wheel. In particular, the electromechanical wheel service brake is part of the vehicle brake system according to the disclosure.

The electromechanical wheel service brake comprises an electric motor which generates a frictional braking effect at a steered vehicle wheel via a rotational/translational motion converter.

BRIEF DESCRIPTION OF DRAWINGS

Further features, advantages and properties of the disclosure will be explained on the basis of the description of exemplary arrangements of the disclosure and with reference to the FIGURES, in which:

FIG. 1: shows a schematic drawing of a vehicle equipped with a system according to the disclosure.

DETAILED DESCRIPTION

FIG. 1 shows a vehicle 10 with two spaced-apart vehicle axles 12, with a steered vehicle axle 18 and an unsteered vehicle axle 20. It is also possible that the vehicle 10 features two steered vehicle axles 18 or the rear axle in the driving direction is steered and the front axle is rigid. Two electromechanical brakes 28, which additionally feature a travel sensor 32, are in each case arranged at the steered vehicle axle 18 and the unsteered vehicle axle 20. The braking device 28 can be activated selectively by the processing unit 14 or an open-loop control unit 44 (not illustrated), wherein the data from the travel sensor 32 can be evaluated for calculating the braking torque. It is also possible that the unsteered vehicle axle 20 features conventional hydraulic brakes and the steered vehicle axle 18 features an electromechanical brake 28 and both brakes are activated by different open-loop control units 44. The two vehicle axles 12 have at their two ends vehicle wheels 16 with which the vehicle 10 rolls on the road surface. The braking force generated by the electromechanical brake 28 is transmitted to the vehicle wheels 16 of the motor vehicle 10 via a wheel brake actuator 30, as a result of which the deceleration takes place.

The motor vehicle 10 additionally features a steering system 22 which is composed of a wheel angle setting unit 24 and a wheel speed sensor 26. The wheel angle setting unit 24 here acts on the wheels of the steered vehicle axle 18 and can set a wheel angle of the vehicle wheels 16 relative to the vehicle 10. The steering system shown in FIG. 1 is designed as a steer-by-wire system, wherein a conventional steering system with mechanical linkage between the steering wheel and the vehicle wheels 16 is also possible. In any case, the wheel angle setting unit communicates the current angle of the vehicle wheels 16 relative to the vehicle 10 to the processing unit 14, wherein the connection between the wheel angle setting unit 24 and the processing unit 14 can be made wirelessly such as by Wi-Fi or Bluetooth or using cables. The activation data can here also be sent by the processing unit 14 to the wheel angle setting unit 24 by wires or wirelessly.

The wheel speed sensors 26 detect the wheel speed of the steered vehicle axle 18 and communicate the measured values for the wheel speed to the processing unit 14 via a connection which is not illustrated. Wheel speed sensors 26 are selectively also provided on the unsteered vehicle axle 20. It is also possible to make use of the wheel speed sensors 26 from a different driver assistance system such as an antilock braking system (ABS) or an electronic stability control (ESC) system.

The processing unit 14 serves as a central open-loop control element for the system according to the disclosure and is connected to all relevant components in order to perform the method. In particular, the processing unit 14 is connected to the braking devices 28 at the steered 18 and unsteered vehicle axle 20, the wheel angle setting unit 24, the sensor devices 33 and the steering angle sensor 38. The processing unit 14 can be accommodated in different open-loop control units 44, wherein the method according to the disclosure is performed in at least one open-loop control unit. It is also possible to evaluate the sensors directly at the measurement point, wherein only the processed signal is sent to the processing unit 14.

The sensor device 33 which is connected to the processing unit 14 can consist of a driving dynamics sensor 42 which detects the acceleration of the vehicle 10 in all three spatial directions, in particular the yaw dimensions such as the yaw rate or yaw angle acceleration. In addition, the sensor device 33 can comprise further sensors which are used to perform the method according to the disclosure, such as, for example, the outside temperature, the air pressure or other environmental factors. The yaw compensation system 100 for generating counter-steering effects at a steered vehicle axle 18 is formed by the driving dynamics sensor 42, the processing unit 14 and the wheel angle setting unit 24.

The interface between the vehicle 10 and the vehicle driver comprises a steering pulse generator 36, such as a steering wheel, which is evaluated via a steering angle sensor 38. The steering angle sensor 38 is designed to detect the steering angle position of the steering wheel and pass it to the processing unit 14. In addition, the steering pulse generator 36 can feature a steering simulator 40 which gives the driver the impression of a direct connection between the vehicle wheel 16 at the steered vehicle axle 18. A steering simulator 40 is not necessary or necessary only to a certain degree in the case of mechanical linkage between the steering pulse generator 36 and the steered vehicle axle 18.

It is possible to detect driving instability in combination with the evaluation of the steering angle sensor 38, wherein, for example, a change in the yaw rate about the vertical axis of the vehicle 10 has no correlation with the pulse of the steering angle sensor 38. This would mean that the vehicle 10 rotates about its vertical axis without there being any steering pulse input. It can consequently be deduced that the vehicle 10 has entered an unstable driving state and action is required in order to restore driving stability.

The driving stability is restored with the aid of a driving stability closed-loop control procedure, wherein the driving stability closed-loop control procedure acts on the wheel angle setting unit 24. For this purpose, the processing unit 14 generates a signal for the wheel angle setting unit 24, whereupon the latter sets the vehicle wheels 16 at the steered vehicle axle 18 according to the signal.

It is in particular provided that a damping amount of the driving stability closed-loop control procedure is variable, wherein said damping amount can be altered by different parameters. These parameters for changing the damping amount can be, for example, the yaw speed or a specific angular position of the steering pulse generator 36.

Isolated features can also as required be singled out from the combinations of features disclosed in the present document and, by breaking a structural and/or functional relationship which may exist between the features, be used in combination with other features to define the subject-matter of the claims. The sequence and/or number of steps of the methods can be varied. The methods can be combined with one another, for example to form an overall method.

The invention claimed is:

1. A yaw compensation system for restoring a safe driving state, comprising:
    a driving dynamics sensor which is configured to determine a yaw dimension;
    a wheel angle setting unit;
    a steering simulator configured to provide driver feedback torque; and
    a processing unit which is configured to identify a driving state on the basis of the yaw dimension,
    wherein the processing unit comprises a driving stability closed-loop control procedure which is designed, in the case of an unsafe driving state, to restore a safe driving state by influencing the wheel angle setting unit, wherein the driving stability closed-loop control procedure for restoring a safe driving state comprises a variable damping amount,
    wherein a transmission ratio between the steering wheel and the wheel angle is modifiable by the processing unit, the modification of the transmission ratio being coordinated with the variable damping amount of the driving stability closed-loop control procedure such that the driver feedback torque is adapted in synchrony with changes in the damping amount.

2. The yaw compensation system according to claim 1, wherein the damping amount is dependent on the yaw dimension.

3. The yaw compensation system according to claim 1, wherein the damping amount increases as the yaw dimension rises.

4. The yaw compensation system according to claim 1, wherein the system comprises a wheel speed sensor and the driving dynamics sensor is configured to determine a lateral acceleration, wherein the processing unit is designed to increase the damping amount when the wheel speed and/or lateral acceleration rises.

5. The yaw compensation system according to claim 1, wherein the system comprises a deceleration device which is designed to be activated by the driving stability closed-loop control procedure, wherein a safe driving state can be restored by deceleration of at least one vehicle wheel.

6. The yaw compensation system according to claim 1, further comprising a steering pulse generator with an electrical connection to the wheel angle setting unit, wherein the processing unit is configured to restore the safe driving state independently of a movement of the steering pulse generator.

7. A vehicle brake system comprising the yaw compensation system designed according to claim 1 and an electrical braking device which is designed to transmit a braking torque to the vehicle wheel.

8. A yaw compensation system for restoring a safe driving state, comprising:
    a wheel angle setting unit;
    a steering simulator configured to provide driver feedback torque; and
    a processing unit configured to identify a driving state based on a yaw dimension,
    wherein the processing unit comprises a driving stability closed-loop control procedure that, in the case of an unsafe driving state, restores a safe driving state by influencing the wheel angle setting unit, wherein the driving stability closed-loop control procedure for restoring a safe driving state comprises a variable damping amount,
    wherein a transmission ratio between the steering wheel and the wheel angle is modifiable by the processing unit, the modification of the transmission ratio being coordinated with the variable damping amount of the driving stability closed-loop control procedure such that the driver feedback torque is adapted in synchrony with changes in the damping amount.

9. The yaw compensation system according to claim 8, wherein the damping amount is dependent on the yaw dimension.

10. The yaw compensation system according to claim 8, wherein the variable damping amount increases as the yaw dimension rises.

11. The yaw compensation system according to claim 8, further comprising a driving dynamics sensor configured to determine the yaw dimension.

12. The yaw compensation system according to claim 11, further comprising a wheel speed sensor, the driving dynamics sensor is configured to determine a lateral acceleration, wherein the processing unit is designed to increase the variable damping amount when the wheel speed and/or lateral acceleration rises.

13. The yaw compensation system according to claim 8, further comprising a deceleration device configured to be activated by the driving stability closed-loop control procedure, wherein a safe driving state can be restored by deceleration of at least one vehicle wheel.

14. The yaw compensation system according to claim 8, further comprising a steering pulse generator with an electrical connection to the wheel angle setting unit, wherein the processing unit is configured to restore the safe driving state independently of a movement of the steering pulse generator.

* * * * *